(12) United States Patent
Rozas et al.

(10) Patent No.: US 6,725,361 B1
(45) Date of Patent: Apr. 20, 2004

(54) METHOD AND APPARATUS FOR EMULATING A FLOATING POINT STACK IN A TRANSLATION PROCESS

(75) Inventors: Guillermo Rozas, Los Gatos, CA (US); David Dunn, San Jose, CA (US); David Dobrikin, Sunnyvale, CA (US); Alex Klaiber, Mountain View, CA (US); Daniel H. Nelsen, San Jose, CA (US)

(73) Assignee: Transmeta Corporation, Santa Clara, CA (US)

( * ) Notice: Subject to any disclaimer, the term of this patent is extended or adjusted under 35 U.S.C. 154(b) by 569 days.

(21) Appl. No.: 09/595,199

(22) Filed: Jun. 16, 2000

(51) Int. Cl.[7] .............................................. G06F 15/00
(52) U.S. Cl. ...................................... 712/222; 712/202
(58) Field of Search .................................. 712/202, 222

(56) References Cited

U.S. PATENT DOCUMENTS

| | | | | |
|---|---|---|---|---|
| 5,522,051 A | * | 5/1996 | Sharangpani | 712/202 |
| 5,551,015 A | * | 8/1996 | Goettelmann et al. | 717/137 |
| 5,687,336 A | * | 11/1997 | Shen et al. | 712/202 |
| 5,696,955 A | * | 12/1997 | Goddard et al. | 712/222 |
| 5,852,726 A | * | 12/1998 | Lin et al. | 712/200 |
| 6,134,573 A | * | 10/2000 | Henry et al. | 708/510 |
| 6,212,678 B1 | * | 4/2001 | Marsden | 717/139 |
| 6,349,383 B1 | * | 2/2002 | Col et al. | 712/226 |

OTHER PUBLICATIONS

Intel Corp.; 1486 Microprocessor; "Floating Point Registers"; pp. 27–35.

* cited by examiner

*Primary Examiner*—Eddie Chan
*Assistant Examiner*—David J. Huisman
(74) *Attorney, Agent, or Firm*—Wagner, Murabito, & Hao LLP

(57) ABSTRACT

A floating point processor including a plurality of explicitly-addressable processor registers, an emulation register capable of storing a value used to logically rename the explicitly-addressable registers to emulate registers of a floating point stack, a computer-executable software process for calculating and changing a value in the emulation register to a value indicating a change in addresses of registers of a floating point stack when executing a floating point stack operation, and adder circuitry combining a register address and the value in the emulation register in response to the computer-executable process to rename the plurality of explicitly-addressable processor registers.

12 Claims, 2 Drawing Sheets

METHOD AND APPARATUS FOR EMULATING A FLOATING POINT STACK IN A TRANSLATION PROCESS

BACKGROUND OF THE INVENTION

1. Field of the Invention

This invention relates to computers and, more particularly, to a method and apparatus for emulating the operation of a floating point stack utilizing processor registers.

2. History of the Prior Art

Many computers utilize a separate processing unit to accomplish mathematic operations. Historically, this separate unit has utilized a plurality of registers to operate on numbers in floating point format. At least one family of processors, the Intel X86 processors, utilizes a memory stack to accomplish floating point operations. The memory stack typically includes a limited number of sequential memory positions utilized as registers. The memory positions are filled in sequence as values are added to the stack and emptied in the opposite sequence as values are removed from the stack. The X86 floating point processor unit (FPU) keeps track of a moving register address called "top of stack" at which values are entered and removed by incrementing or decrementing the top of stack address whenever an operand is entered or removed from the stack. The top of stack is also utilized as the position relative to which other positions are addressed for many of the operations of which the floating point unit is capable. Since the top-of-stack moves and other stack registers used in operations are addressed relative to top of stack, the addressing scheme utilized is often referred to as relative, implicit, or indirect addressing. Because of this type of addressing, floating point processors utilizing a stack arrangement (hereinafter referred to as a "floating point stack") accomplish floating point operations quite differently than do floating point processors using registers which are directly or explicitly addressed by register name.

Although the X86 processors are the most prevalent utilizing a floating point stack, there are other examples of such arrangements. Consequently, while this specification often uses the X86 designation as a shorthand in describing the invention, it should be understood that other examples of floating point stacks are intended to be included within the description. Moreover, the invention may be utilized in stack arrangements that are used for other than floating point operations.

A major difficulty with the original X86 relatively-addressed floating point stack is its limited ability to accomplish floating point operations rapidly. The original X86 floating point unit was designed with only eight memory positions functioning as registers. Eight positions are insufficient to always provide the various operands at the precise time they are needed to accomplish floating point operations. Eight positions allows little room for preprocessing or for storing results to be used in subsequent operations. Moreover, the floating point stack organization is such that it must implicitly update the top-of-stack after each operation on the stack; and prior art circuitry is designed to automatically accomplish this result.

Since the relatively-addressed floating point stack of the Intel X86 processors was utilized as the basis for a very large number of applications over a large number of years, any processor which is utilized to execute these applications must be able to carry out the operations of the X86 floating point stack.

Modern floating point processors utilize registers that are addressed directly and are not subject to the difficulties of floating point stacks. Modern floating point units have a relatively large number of individual registers so that preliminary computational operations may be carried out before their results are needed and results may be stored in the floating point unit for later use. Consequently, floating point units using directly addressed registers may function quite rapidly. However, it is quite difficult to utilize a floating point unit having directly-addressed registers to carry out floating point operations programmed to be carried out by a relatively-addressed floating point stack.

One modern processor is a very long instruction word (VLIW) processor designed to execute programs designed for other "target processors." This VLIW processor typically receives its instructions in a form adapted to be executed by a target processor which has an entirely different instruction set than does the VLIW processor (the host processor). The VLIW processor dynamically translates a stream of target instructions into instructions of its own host instruction set and stores those translated host instructions so that they may be reexecuted without being translated again. This processor is described in detail in U. S. Pat. No. 6,031,992, entitled Combining Hardware And Software To Provide An Improved Microprocessor, Cmelik et al, issued Feb. 29, 2000, and assigned to the assignee of the present application.

This VLIW processor is often utilized to execute X86 programs. However, this processor utilizes a modern floating point unit with registers which are addressed directly.

It is desirable to provide a method and apparatus by which a modern floating point unit is able to execute floating point processes designed to be executed by a floating point stack more rapidly than can the floating point stack.

More particularly, it is desired to provide an improved addressing arrangement for enabling rapid execution of relatively-addressed stack instructions by an explicitly-addressed register array.

SUMMARY OF THE INVENTION

The present invention is realized by a floating point processor comprising a plurality of explicitly-addressable processor registers, an emulation register capable of storing a value used to logically rename the explicitly-addressable registers to emulate registers of a floating point stack, a computer-executable software process for calculating and changing a value in the emulation register to a value indicating a change in addresses of registers of a floating point stack when executing a floating point stack operation, and adder circuitry combining a register address and the value in the emulation register in response to the computer-executable process to rename the plurality of explicitly-addressable processor registers.

These and other features of the invention will be better understood by reference to the detailed description which follows taken together with the drawings in which like elements are referred to by like designations throughout the several views.

DETAILED DESCRIPTION

Figure 1:
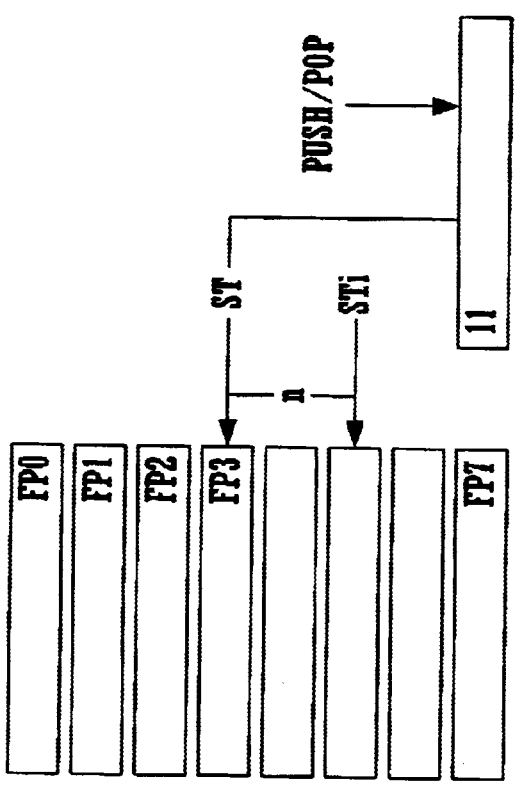
FIG. 1 is a diagram of prior art floating point stack circuitry.

The typical operation of a floating point stack 10 is illustrated with reference to FIG. 1. The stack 10 illustrated is an X86 floating point unit although other floating point units have utilized stack arrangements and may be emulated utilizing the invention. Moreover, the invention utilizing explicitly addressed registers may be used to emulate any stack arrangement of registers.

The floating point unit 10 typically includes eight individual memory positions FP0–FP7 which are utilized as registers. One of the memory positions FP0–FP7 is referred to as top-of-stack (ST). Instructions typically address these memory positions relative to the position which is designated as the top-of-stack. The register which is top-of-stack position is stored as a field in a status register 11. In the X86 architecture, the top-of-stack is decremented ("grows down") toward lower numbered stack registers (from FP7 toward FP0) as additional operands are placed into the memory positions on the stack by decrementing the value in the field of the status register 11. Similarly, the top-of-stack is incremented toward higher numbered stack registers as operands are removed from the stack.

Top-of-stack is a position with respect to which most operations are conducted by the floating point unit 10 The other register positions are typically addressed with reference to the top-of-stack. An operation that accesses location n from the top of the stack (ST) accesses register ST(n) (i.e., register ST+n). For example, a typical floating point subtraction instruction fsub %st(n),%st subtracts the value in register ST(n) from the value in the top-of-stack position. Thus, if register FP3 were to be designated as top-of-stack, then the value in the register FP(n+3) would be subtracted from the value in register FP3 and stored back in register FP3.

However, the top-of-stack position changes physically as operation which are conducted by the floating point unit 10 load or remove data from stack registers.

Some more specific examples of X86 floating point operations will provide background for understanding stack operations.

Assume that top-of-stack is register FP4 before the instruction:

flds 0x61868.

This instruction loads (pushes) a new value on the stack. The instruction first decrements top-of-stack and then writes the value loaded into FP register ST.

Assuming top-of-stack is register FP4 before the instruction, this would set top-of-stack to register FP3, and write register FP3. The instruction fxch %st(3)

exchanges two stack elements without changing top-of-stack. It exchanges the contents of the register addressed by ST(0) and the register addressed by ST(3).

Assuming top-of-stack is register FP4 before the instruction, this would exchange the values in registers FP4 and FP7. The instruction faddp %st,%st(3)

adds the contents of two stack registers, writes the result to one of the registers, and pops data from one of them off the stack. In particular, it adds the contents of registers ST and ST(3), writes the result to register ST(3), and then increments top-of-stack by one.

Assuming top-of-stack is register FP4 before the instruction, the instruction would add the contents of registers FP4 and FP7, write the result to register FP7, and set top-of-stack to register FP5.

As it is implemented in prior art processors, the stack is not actually a true stack which grows infinitely but is a circular buffer which "wraps around." Thus the ST(n) arithmetic is computed modulo 8 (there are only eight registers). Consequently, only the lowest valued three bits of the result are significant.

A three bit ST field in the floating point status word is used in X86 floating point operations to keep track of top-of stack. In X86 processors, this field is incremented or decremented by hardware with each floating point operation which changes the top-of-stack. The need to change top-of-stack after each such floating point operation slows floating point operations in X86 processors significantly.

Since a myriad of programs utilize the X86 floating point unit for execution, it is necessary that a processor which emulates X86 programs be able to execute X86 floating point instructions.

However, in order to obtain significant speed in execution of floating point operations, most modern processors utilize floating point units having a large number of registers which are directly addressed. Floating point instructions typically require a significant number of processor cycles to execute. By utilizing a large number of floating point registers, it is possible to pipeline floating point operations and thereby reduce the average time required for each such operation. Moreover, pipelining allows additional speed to be obtained by reordering floating point operations to take advantage of unused cycles.

However, a modern floating point unit having registers which are directly addressed does not operate in a manner which utilizes top-of-stack referencing in its operations. It is therefore necessary that some manner of executing floating point instructions designed for a floating point stack be carried out if a modern processor is to execute X86 programs.

Although it would be possible to emulate the entire operation of a floating point stack in a manner identical to the operation of a X86 floating point unit, such a floating point unit would not function rapidly and would therefore slow the operation of a computer utilizing the processor.

It is therefore desirable to utilize a modern floating point unit having registers which are directly addressed to emulate operations of a floating point stack without the speed limiting restrictions of floating point stacks. To accomplish this, it is necessary to provide for executing floating point instructions programmed to be executed by a floating point stack in a manner so that the execution may be pipelined. In order to be able to benefit from the pipelining process, it is necessary to understand how the floating point registers are being utilized during the execution of any sequence of operations so that the registers may be explicitly addressed.

The present invention allows a floating point unit having registers which are directly addressed to emulate operations of a relatively-addressed floating point stack while utilizing its large plurality of registers to accomplish pipelining and other operations which speed the execution of floating point operations. It also eliminates restrictions of the typical floating point stack.

Figure 2:
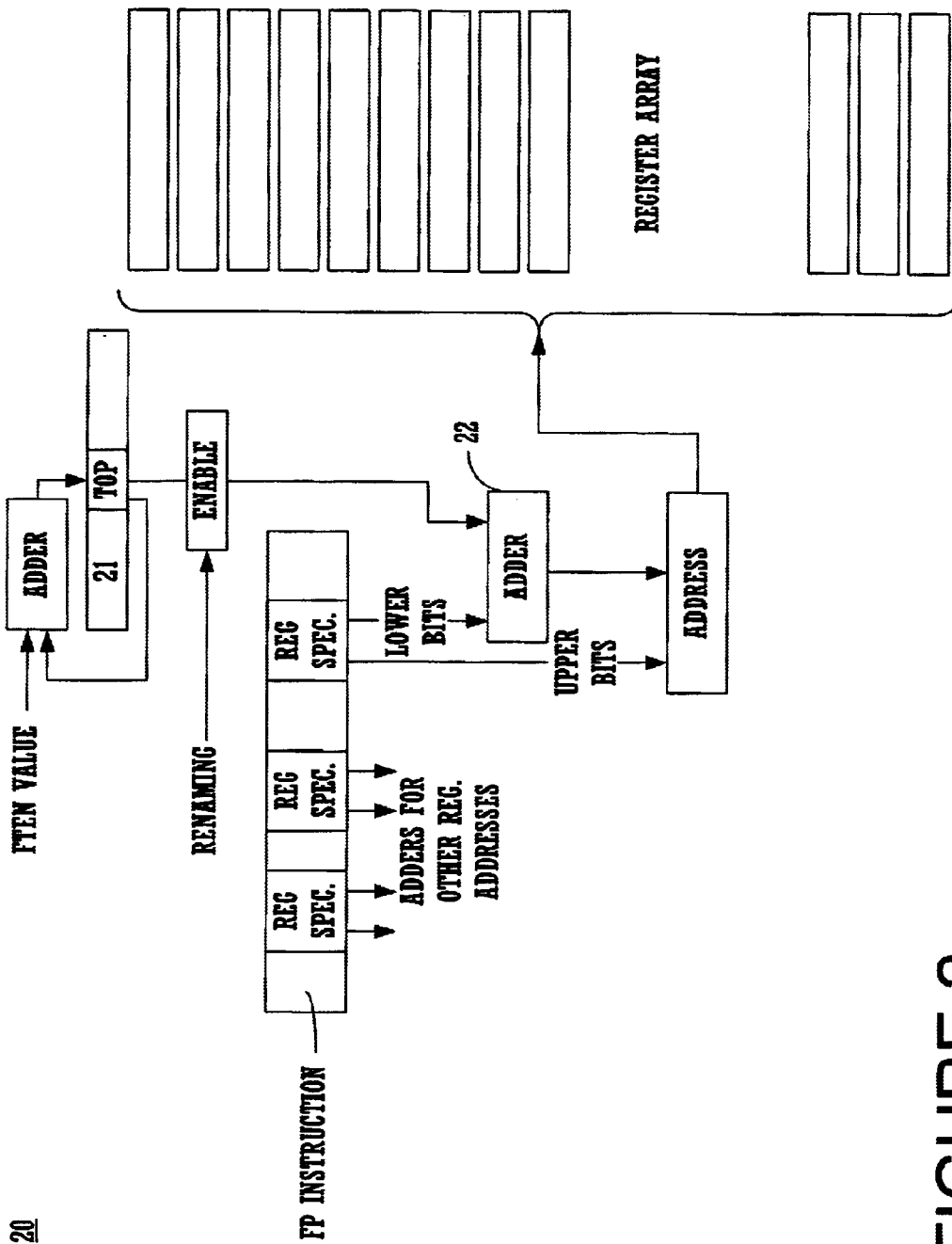
FIG. 2 is a diagram of circuitry designed in accordance with the present invention for carrying out floating point stack operations.

The present invention accomplishes this result in an elegant manner. A typical floating point instruction for the host VLIW processor includes register specifiers (register addresses) indicating the floating point registers which are to be used for the operation. The floating point circuitry 20 (illustrated in FIG. 2) includes a floating point status register 21 which includes a top-of-stack field having a number of positions sufficient to hold a value equivalent to the number of registers in the floating point stack which is being emulated. When used to emulate X86 floating point operations, the status register 21 need include only three bit positions to represent the top-of-stack for the eight memory positions (registers) of the X86 floating point unit. For other physical stack sizes, other sizes would be utilized.

In addition to the status register 21, the floating point circuitry includes an adder 22 for each register operand and control circuitry adapted to add the top-of-stack value in register 21 to a similar number of the bits of the register specifiers designating the floating point registers used in the operation and then replace those low order bits in of the register specifiers with the results of the addition. The floating point circuitry 20 functions on command of the translation software so that it may be caused to decrement the value in the status register 21 when a floating point command would place a new operand on the stack (push) in the environment being emulated and to increment the top-of-stack value in the status register 21 when a floating point command would remove (pop) an operand from the stack.

By utilizing the circuitry in the manner described, the directly-addressed registers of a modern floating point unit may be caused to emulate exactly the operations of a floating point stack. The need to update the top-of-stack value in the floating point status register after each floating point operation which increments or decrements top-of-stack can be met by an explicit instruction accompanying each push or pop operation. So used, such a unit would not offer the advantages afforded by pipelining and reordering since it would still be restricted to operation in a manner similar to typical floating point stacks.

This difficulty may, however, be eliminated using the present invention. It should be noticed that operations on the stack are totally predictable so that the effect of a sequence of operations can be predicted just as easily as the effect of a single instruction. It is, however, difficult to know the position of the top-of-stack at the beginning of any sequence. If top of stack is known, the register being manipulated in every single instruction of a sequence (exceptions being disregarded) is also known).

For example, consider the following sequence of instructions in which top-of-stack is assumed to be register FP5 initially. Each X86 instruction in the sequence uses the following registers and updates ST as follows:

| Instruction | | Dest | Source1 | Source2 | ST after inst. |
|---|---|---|---|---|---|
| fildl | 0 x 618e4 | FP4 | MEMORY | | 4 |
| flds | 0 x 61868 | FP3 | MEMORY | | 3 |
| fmul | % st(1),% st | FP3 | FP4 | FP3 | 3 |
| flds | 0 x 61864 | FP2 | MEMORY | | 2 |
| fmul | % st(2),% st | FP4 | FP4 | FP2 | 2 |
| fxch | % st(1) | FP2 | FP3 | | 2 |
| faddp | % st,% st(3) | FP5 | FP2 | FP5 | 3 |
| fxch | % st(1) | FP3 | FP4 | | 3 |
| fmuls | 0 x 61860 | FP3 | FP3 | MEMORY | 3 |
| fxch | % st(1) | FP3 | FP4 | | 3 |
| faddp | % st,% st(3) | FP6 | FP3 | FP6 | 4 |
| flds | 0 x 61a20 | FP3 | MEMORY | | 3 |
| fxch | % st(1) | FP3 | FP4 | | 3 |
| faddp | % st,% st(4) | FP7 | FP3 | FP7 | 4 |
| fdiv | % st(1),% st | FP4 | FP5 | FP4 | 4 |

When each instruction is carried out to completion before the next instruction is begun (as with a typical floating point stack processor), the top-of-stack of the floating point unit host processor is set to correspond directly to the top-of-stack of the target x86 processor with each instruction; and registers are referenced based on that identity. Because of this, the problem is guessing what top-of-stack is at the start of a sequence of translated instructions is eliminated. Once top-of-stack is known, the registers used in each instruction are known.

Rather than executing each instruction in the sequence to completion before the next, the renaming circuitry of the present invention may be utilized. As will be seen, this allows a significant acceleration in executing floating point instructions.

A simple instruction such as the register exchange instruction fxch %st(3)

can be translated as (ignoring scheduling):

| fmov | % fptemp,% fp0 | // % fptemp is a temporary FP register |
| fmov | % fp0,% fp3 | // % fp0 is FP register ST |
| fmov | % fp3,% fptemp | // % fp3 is FP register ST(3). |

Because the instruction does not change top-of-stack, there is no need to adjust top-of-stack.

A slightly more complicated instruction flds 0x61868 can be translated as (ignoring scheduling):

| movi | temp,0 x 61868 | // integer move to temp integer register |
| ften | 7 | // subtract 1 from stack top |
| fld.32 | % fp0,[temp] | // load into new stack top |

The "FTEN 7" instruction enables renaming and adds seven to top-of-stack. Since top-of-stack is indicated by a three-bit value which rotates, adding seven effectively subtracts one from top-of-stack.

However, there is an even better translation, namely:

| movi | temp,0 x 61868 | // integer move to temp integer register |
| fld.32 | % fp7,[temp] | // load into new stack top |
| ften | 7 | // subtract 1 from stack top |

Since the FTEN instruction is moved below the FLD instruction so that the register name adjustment does not occur until after the load, the register %fp0 of the previous translation which is loaded after decrementing top-of-stack is the same as register %fp7 before decrementing top-of-stack. This may be stated as:

new_ST=old_ST−1

<old_ST+7>=<old_ST−1+8>=<new_ST+8>=<new_ST+0> because the arithmetic is done modulo 8.

This important property can be applied to translating an entire sequence of instructions. It will be found when this is done that an adjusting "FTEN" instruction is not required for every instruction. The FTEN instruction can be delayed until the very end of the sequence and done only once for the entire sequence since the registers utilized can be predicted.

The sequence of instructions in the example above provides a model for this. FTEN instructions can be moved down the sequence by adjusting the register numbers as instructions are passed so that the delays due to the execution of FTEN instructions after each individual instruction in the sequence are eliminated. This sequence may be reordered and scheduled by the dynamic translator.

Consider the following sequence (the first two instructions of the long sequence above):

|       |              |
|-------|--------------|
| fildl | 0 × 618e4    |
| flds  | 0 × 61868    |

If translated in isolation and sequentially, they appear as follows:

|        |              |
|--------|--------------|
| movi   | temp,0 × 618e4 |
| ften   | 7            |
| fild.32 | % fp0,[temp] |
| movi   | temp,0 × 61868 |
| ften   | 7            |
| fld.32 | % fp0,[temp] |

But the same transformation that was accomplished above (i.e., move the FTEN instructions downwards) can be practiced here to produce:

|        |              |
|--------|--------------|
| movi   | temp,0 × 618e4 |
| fild.32 | % fp7,[temp] |
| ften   | 7            |
| movi   | temp,0 × 61868 |
| fld.32 | % fp7,[temp] |
| ften   | 7            |

Furthermore, the first FTEN instruction can be moved past the next two instructions (the movi instruction is not affected since it is an integer instruction) to produce:

|        |              |
|--------|--------------|
| movi   | temp,0 × 618e4 |
| fild.32 | % fp7,[temp] |
| movi   | temp,0 × 61868 |
| fld.32 | % fp6,[temp] |
| ften   | 7            |
| ften   | 7            |

It should be noticed that renaming register %fp7 to be register %fp6 when the FTEN instruction is moved past the instruction is done for the same reason that register %fp0 is renamed to %fp7 above. In fact, every time that a "FTEN N" instruction is moved past a floating point instruction, N (modulo 8) is added to the FP register numbers (e.g., 7+7=14=6 mod 8).

Once all the FTEN 7 instructions are grouped together in the sequence, they can be collapsed by adding seven for each of them (one could as well add 14=6 mod 8). Thus, the short portion of the sequence becomes:

|        |              |
|--------|--------------|
| movi   | temp,0 × 618e4 |
| fild.32 | % fp7,[temp] |
| movi   | temp,0 × 61868 |
| fld.32 | % fp6,[temp] |
| ften   | 6            |

Rather than actually carrying out this simplistic set of operations, the operations are simply tracked in one embodiment of the invention by the translation software. That is, the software tracks the change of register names and the movement of FTEN instructions. The translator software keeps track of what the relative top-of-stack would be and generates register specifiers accordingly. Since FTEN is an explicit instruction, generation of any FTEN instruction may be (and is) delayed until the end of the translated sequence has been generated. At the end of the sequence, if the relative top-of-stack is not zero (there is a net push/decrement or a net pop/increment), a FTEN instruction is emitted for the net displacement value.

Thus, the long sequence above would be translated as follows, without optimization, scheduling, and other details that are irrelevant in describing this invention. The comments indicate each original X86 instruction.

|    |         |                |                         |
|----|---------|----------------|-------------------------|
| // | fildl   | 0 × 618e4      |                         |
|    | movi    | temp,0 × 618e4 |                         |
|    | fild.32 | % fp7,[temp]   |                         |
| // | flds    | 0 × 61868      |                         |
|    | movi    | temp,0 × 61868 |                         |
|    | fld.32  | % fp6,[temp]   |                         |
| // | fmul    | % st(1),% st   |                         |
|    | fmul    | % fp6,% fp7,% fp6 |                      |
| // | flds    | 0 × 61864      |                         |
|    | movi    | temp,0 × 61864 |                         |
|    | fld.32  | % fp5,[temp]   |                         |
| // | fmul    | % st(2),% st   |                         |
|    | fmul    | % fp5,% fp7,% fp5 |                      |
| // | fxch    | % st(1)        |                         |
|    | fmov    | % fptemp,% fp5 |                         |
|    | fmov    | % fp5,% fp6    |                         |
|    | fmov    | % fp6,% fptemp |                         |
| // | faddp   | % st,% st(3)   |                         |
|    | fadd    | % fp0,% fp5,% fp0 |                      |
| // | fxch    | % st(1)        |                         |
|    | fmov    | % fptemp,% fp6 |                         |
|    | fmov    | % fp6,% fp7    |                         |
|    | fmov    | % fp7,% fptemp |                         |
| // | fmuls   | 0 × 61860      |                         |
|    | movi    | temp,0 × 61860 |                         |
|    | flds    | % fptemp,[temp] |                        |
|    | fmul    | % fp6,% fptemp,% fp6 |                   |
| // | fxch    | % st(1)        |                         |
|    | fmov    | % fptemp,% fp6 |                         |
|    | fmov    | % fp6,% fp7    |                         |
|    | fmov    | % fp7,% fptemp |                         |
| // | faddp   | % st,% st(3)   |                         |
|    | fadd    | % fp1,% fp6,% fp1 |                      |
| // | flds    | 0 × 61a20      |                         |
|    | movi    | temp,0 × 61a20 |                         |
|    | fld.32  | % fp6,[temp]   |                         |
| // | fxch    | % st(1)        |                         |
|    | fmov    | % fptemp,% fp6 |                         |
|    | fmov    | % fp6,% fp7    |                         |
|    | fmov    | % fp7,% fptemp |                         |
| // | faddp   | % st,% st(4)   |                         |
|    | fadd    | % fp2,% fp6,% fp2 |                      |
| // | fdiv    | % st(1),% st   |                         |
|    | fdiv    | % fp6,% fp7,% fp6 |                      |
|    | ften    | 7              | // Net push/decrement by 1 |

An improvement to the invention above-described significantly enhances the operation of one embodiment of the VLIW processor. Using the invention in the manner described above causes many floating point translations to end with a FTEN instruction because many translations end with a net push or pop of the floating point stack. An FTEN instruction executes slowly in one particular embodiment of the new processor, and the translator must wait until the FTEN instruction has completed executing to know the top-of-stack in order to correctly translate any following sequence of instructions.

In order to eliminate the wait for the FTEN instruction to execute at the end of a first sequence of translated instructions, the improved invention instead assumes what the top-of-stack will be at the end of the first sequence and translates the following sequence of instructions using this assumed value.

In a first embodiment of this improvement, the assumed value for top-of-stack is retained as a part of context so that it may be compared with an actual value for top-of-stack after completion of the preceding sequence of translated instructions. A translation is generated using the assumed value. Before the succeeding translation is executed, the actual top-of-stack determined by the translation software at the completion of the preceding sequence is compared to the assumed value. If the values are the same, the succeeding translation is executed. If the values differ, the operation of the processor is rolled back to state existing at the beginning of the translation; and a new translation is utilized. This roll back process is described in detail in the above-referenced patent.

This improvement in the invention which eliminates the need to use the FTEN instruction works in most situations and eliminates the delays caused by the need to execute a FTEN instruction at the end of a translated sequence of instructions. However, the process requires that a number of translations be provided for cases in which top-of-stack varies from the value expected. The large number of translations creates a significant problem with the particular VLIW processor because the buffer area available for storing translated instructions is finite.

A clever variation of the improvement eliminates the need for a plurality of translations by re-using a translation made with an incorrect top-of-stack assumption.

For example, suppose a translation is generated assuming that x86 top-of-stack is register FP4. At runtime, if x86 top-of-stack is register FP4, the translation executes properly. However, if x86 top-of-stack is not register FP4, the FTEN instruction can be used to appear to rotate the registers so that the translation works as coded.

Assume that the original instruction is:

fxch %st(3)

which was translated assuming that x86 top-of-stack is register FP4 (and always assuming that host top-of-stack is 0), the floating point part of the translation is

| | |
|---|---|
| fmov | % fptemp,% fp4 |
| fmov | % fp4,% fp7 |
| fmov | % fp7,% fptemp | and the translation executes properly when x86 top-of-stack is register FP4.
However, if x86 top-of-stack were to be register FP3 at runtime, the translation would instead have to be:

| | |
|---|---|
| fmov | % fptemp,% fp3 |
| fmov | % fp3,% fp6 |
| fmov | % fp6,% fptemp |

However, the first translation can be reused by "rotating" the registers so that references to %fp4 act on register %fp3 and the like. This can easily be done by subtracting one from host top-of-stack (not x86 top-of-stack which is architectural x86 state).

In other words, the fragment,

| | |
|---|---|
| ften | 7 |
| fmov | % fptemp,% fp4 |
| fmov | % fp4,% fp7 |
| fmov | % fp7,% fptemp | behaves like the fragment,

| | |
|---|---|
| fmov | % fptemp,% fp3 |
| fmov | % fp3,% fp6 |
| fmov | % fp6,% fptemp |

This results because moving a FTEN instructions past a floating point instruction decrements a floating point register number in the instruction. Of course, at the end of the first sequence host top-of-stack has changed, while the bottom sequence has not. The issue then becomes that of managing the host top-of-stack and producing the x86 top-of-stack as required.

The problem may be solved by observing that the original top-of-stack sequence was translated assuming $$\frac{x86}{4} \quad \frac{\text{predicted } x86\,ST}{4} \quad \frac{\text{host } ST}{0}$$

and when it was discovered that x86 top-of-stack was register FP3, the sequence could be emulated using $$\frac{x86\,ST}{3} \quad \frac{\text{predicted } x86\,ST}{4} \quad \frac{\text{host } ST}{-1\ (=7\bmod 8)}$$

where the code in a translation depends only on the predicted x86 top-of-stack.

Thus, it may be seen that a translation must only check the predicted x86 top-of-stack, not the actual x86 top-of-stack. It can also be seen that the actual x86 top-of-stack is the sum of the predicted x86 top-of-stack and the host top-of-stack.

To accomplish this result, new renaming hardware was added in accordance with the invention. A new "register" (or part thereof is added to hold the predicted x86 top-of-stack. In one embodiment, the new register is simply be one of the general integer registers that is utilized by software for this purpose.

The predicted x86 top-of-stack is used to generate translations. The predicted X86 top-of-stack is updated by translations in the described way. A translation with a net push decrements predicted X86 top-of-stack by the appropriate amount, a translation with a net pop increments predicted X86 top-of-stack by the appropriate amount, and a translation with no net push or pop leaves predicted X86 top-of-stack unchanged.

The host top-of-stack is used (via the FTEN instruction) to "adjust" translations to match differences between the predicted value of top-of-stack at translation time and the value found at run time.

The x86 top-of-stack is not directly mapped to the host state. It can be computed as needed by adding the predicted x86 top-of-stack to the host top-of-stack (TOP value in register 21). When set from the x86, the host top-of-stack is cleared and the predicted x86 top-of-stack is set to the actual x86 top-of-stack. Operations that do this must end translations.

Each translation checks that the prediction at translation time matches the current prediction. If the two match, the translation proceeds normally and updates the current prediction as appropriate.

If the translation-time prediction and the current prediction do not match, the translation software rolls back execution to the beginning of the translation, adjusts the host top-of-stack and current prediction so that the new current prediction is the translation-time prediction and so that the new host top-of-stack added to the new current prediction leaves x86 top-of-stack (the sum) undisturbed. The translation is then restarted from the beginning.

The roll back and restart are not strictly necessary. The checking and adjustment could be done before any floating point instructions in the translation. However, that would be a serious scheduling constraint. In order to relax the scheduling constraint, the floating point operations can be placed to occur before the check and adjustment. Of course, at that point, if there is adjustment to be done, the translation must be rolled back and restarted after the adjustment is done.

The actual adjustment can be done in line or out of line. For a variety of reasons (especially given that the rollback and adjustment is very rare), it is typically done out of line, and the translation merely does the check and then branches out if there is a mismatch.

Returning to the long example used above, the core of the translation (without optimization and rescheduling and with certain details omitted for clarity) would be:

Assume that the predicted x86 top-of-stack is register FP5 at translation time:

|   |       |                          |
|---|-------|--------------------------|
|   | asub  | temp,predicted_x86_ST,5  |
|   | abrcc.#ne | rollback_and_adjust  |
| // | fildl | 0 × 618e4               |
|   | movi  | temp,0 × 618e4           |
|   | fld.32 | % fp4,[temp]            |
| // | flds  | 0 × 61868               |
|   | movi  | temp,0 × 61868           |
|   | fld.32 | % fp3,[temp]            |
| // | fmul  | % st(1),% st             |
|   | fmul  | % fp3,% fp4,% fp3        |
| // | flds  | 0 × 61864               |
|   | movi  | temp,0 × 61864           |
|   | fld.32 | % fp2,[temp]            |
| // | fmul  | % st(2),% st             |
|   | fmul  | % fp2,% fp4,% fp2        |
| // | fxch  | % st(1)                  |
|   | fmov  | % fptemp,% fp2           |
|   | fmov  | % fp2,% fp3              |
|   | fmov  | % fp3,% fptemp           |
| // | faddp | % st,% st(3)             |
|   | fadd  | % fp5,% fp2,% fp5        |
| // | fxch  | % st(1)                  |
|   | fmov  | % fptemp,% fp3           |
|   | fmov  | % fp3,% fp4              |
|   | fmov  | % fp4,% fptemp           |
| // | fmuls | 0 × 61860               |
|   | movi  | temp,0 × 61860           |
|   | flds  | % fptemp,[temp]          |
|   | fmul  | % fp3,% fptemp,% fp3     |
| // | fxch  | % st(1)                  |
|   | fmov  | % fptemp,% fp3           |
|   | fmov  | % fp3,% fp4              |
|   | fmov  | % fp4,% fptemp           |
| // | faddp | % st,% st(3)             |
|   | fadd  | % fp6,% fp3,% fp6        |
| // | flds  | 0 × 61a20               |
|   | movi  | temp,0 × 61a20           |
|   | fld.32 | % fp3,[temp]            |
| // | fxch  | % st(1)                  |
|   | fmov  | % fptemp,% fp3           |
|   | fmov  | % fp3,% fp4              |
|   | fmov  | % fp4,% fptemp           |
| // | faddp | % st,% st(4)             |
|   | fadd  | % fp7,% fp3,% fp7        |
| // | fdiv  | % st(1),% st             |
|   | fdiv  | % fp4,% fp5,% fp4        |
|   | sub   | predicted_x86_ST,predicted_x86_ST,1 // net push |
|   | and   | predicted_x86_ST,predicted_x86_ST,7 // modulo 8 |

As explained above, the improved invention eliminates the need to provide a plurality of translations even though the predicted top-of-stack value used to create a translation differs from that actually determined at runtime.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A floating point processor comprising a plurality of explicitly-addressable processor registers, an emulation register capable of storing a value used to logically rename the explicitly-addressable registers to emulate registers of a floating point stack, a computer-executable software process for calculating and changing a value in the emulation register to a value indicating a change in addresses of registers of a floating point stack when executing a floating point stack operation, and adder circuitry for combining a register address and the value in the emulation register in response to the computer-executable process to rename the plurality of explicitly-addressable processor registers, and for comparing a top-of-stack with a predicted top-of-stack and selecting a translation of a next stack instruction for execution based upon the comparison.

2. A floating point processor as claimed in claim 1 in which the adder circuitry includes a number of adders sufficient to add the value and register addresses for each register involved in carrying out an instruction.

3. In a processor which dynamically translates instructions programmed in a target instruction set to instructions in a host instruction set, a process for executing stack operations utilizing a plurality of explicitly-addressed registers comprising the steps of:

executing a stack instruction utilizing selected ones of the explicitly-addressed registers, detecting any change in top-of-stack caused by the executed stack instruction, explicitly instructing a rotation of addresses of the selected ones of the plurality of explicitly-addressed registers by an amount depending on the change in top-of-stack, and comparing the top-of-stack with a predicted top-of-stack and selecting a translation of a next stack instruction for execution based upon the comparison.

4. A process as claimed in claim 3 in which the step of executing a stack instruction utilizing selected ones of the explicitly-addressed registers includes executing each of a sequence of-stack instructions, the step of detecting any change in top-of-stack caused by the executed stack instruction includes accruing changes in top-of-stack caused by the executed instructions during the sequence, and the step of explicitly instructing a rotation of addresses of the selected ones of the plurality of explicitly-addressed registers is by an amount depending on the accrued changes in top-of-stack.

5. A process as claimed in claim 4 in which the stack operations are floating point stack operations.

6. Apparatus which dynamically translates instructions programmed in a target instruction set to instructions in a host instruction set and for executing instructions programmed for execution by a relatively-addressed stack comprising:

a plurality of explicitly-addressed registers, a storage device capable of storing a top-of-stack address assigned to one of the explicitly-addressed registers with respect to which others of the plurality of explicitly-addressed registers are addressed, a computer-implemented software process for accruing changes in a top-of-stack address over a selected interval of instructions and generating an instruction to change a top-of-stack address held by the storage device, and for comparing a top-of-stack with a predicted top-of-stack and selecting a translation of a next stack instruction for execution based upon the comparison, and renaming circuitry responding to the instruction to combine a top-of-stack address held by the storage device and addresses relative to the top-of-stack of the explicitly-addressed registers.

7. Apparatus as claimed in claim 6 in which the renaming circuitry comprises adder circuitry for combining an address relative to the top-of-stack of the explicitly-addressed registers and a top-of-stack address held by the storage device.

8. Apparatus as claimed in claim 7 in which in the adder circuitry comprises a plurality of adders sufficient to add the top-of-stack address and addresses relative to the top-of-stack of the explicitly-addressed registers for each register involved in carrying out an instruction.

9. Apparatus as claimed in claim 7 in which in the relatively-addressed stack is a floating point stack.

10. A process for executing stack operations utilizing a plurality of explicitly-addressed registers in a host processor which dynamically translates instructions programmed in a target instruction set to instructions in a host instruction set comprising the steps of:

executing a stack instruction utilizing selected ones of the explicitly-addressed registers, detecting any change in top-of-stack caused by the executed stack instruction, translating a next stack instruction assuming a top-of-stack at a predicted one of the explicitly-addressed registers without waiting to determine if top-of-stack is at the predicted one of the explicitly-addressed registers, comparing top-of-stack with predicted top-of-stack after rotation and before execution of the next stack instruction, executing the next stack instruction if top-of-stack and predicted top-of-stack compare, and selecting a different translation of the next stack instruction for execution if top-of-stack and predicted top-of-stack do not compare.

11. A process as claimed in claim 10 further comprising the further step of correcting the explicitly-addressed registers used in the translation of the next stack instruction to reflect the one of the explicitly-addressed registers determined to be top-of-stack, and executing the next stack instruction using the corrected explicitly-addressed registers.

12. A process as claimed in claim 11 in which the step of correcting the explicitly-addressed registers used in the translation of the next stack instruction comprises adjusting host top-of-stack by the accrued changes in predicted top-of-stack.

* * * * *